No. 739,778. PATENTED SEPT. 22, 1903.
H. H. CUMMINGS.
TARGET PRACTICE APPARATUS.
APPLICATION FILED JULY 10, 1903.
NO MODEL 8 SHEETS—SHEET 1.

Witnesses:
Horace A. Crossman.
Thomas B. Booth.

Inventor:
Henry H. Cummings
by Frederick L. Emery
Atty.

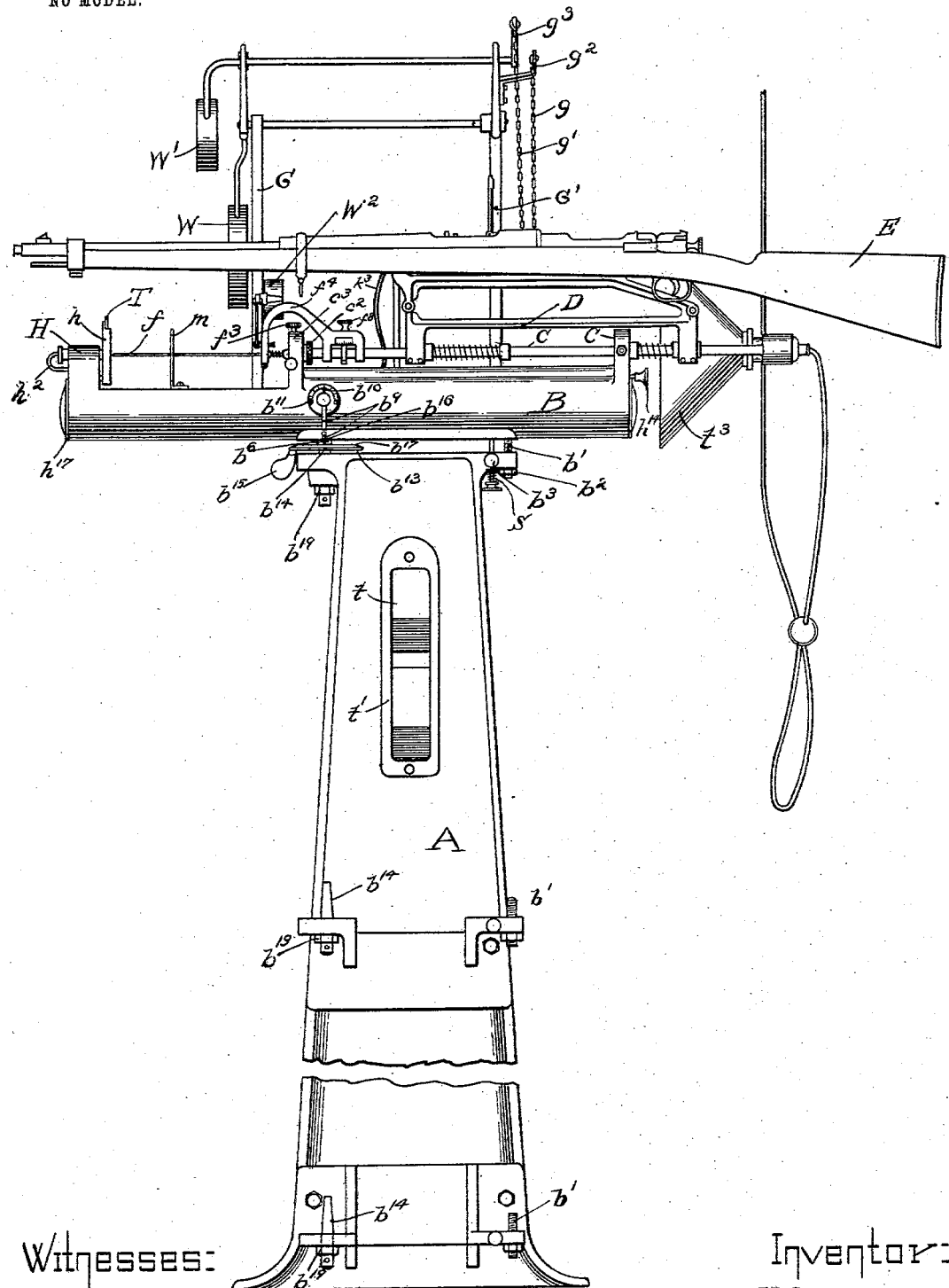

No. 739,778. PATENTED SEPT. 22, 1903.
H. H. CUMMINGS.
TARGET PRACTICE APPARATUS.
APPLICATION FILED JULY 10, 1903.
NO MODEL. 8 SHEETS—SHEET 3.
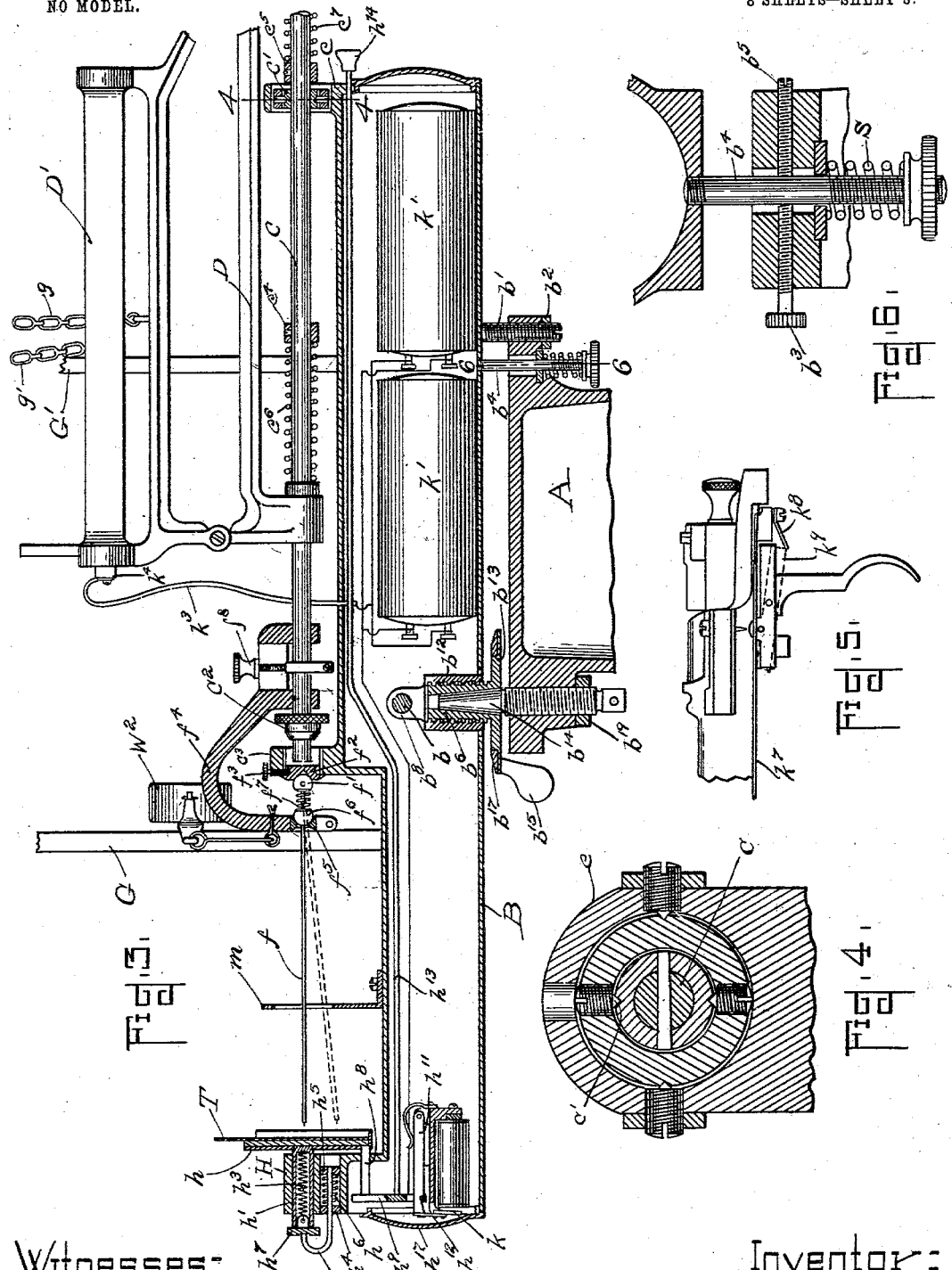
Witnesses:
Horace A. Crossman
Thomas B. Booth
Inventor:
Henry H. Cummings
by Frederick L. Emery
Atty.

No. 739,778. PATENTED SEPT. 22, 1903.
H. H. CUMMINGS.
TARGET PRACTICE APPARATUS.
APPLICATION FILED JULY 10, 1903.
NO MODEL. 8 SHEETS—SHEET 4.

Witnesses:
Horace A. Crossman.
Thomas B. Booth.

Inventor:
Henry H. Cummings
by Frederick L. Emery
Atty.

No. 739,778. PATENTED SEPT. 22, 1903.
H. H. CUMMINGS.
TARGET PRACTICE APPARATUS.
APPLICATION FILED JULY 10, 1903.
NO MODEL. 8 SHEETS—SHEET 6.

Witnesses:
Horace A. Crossman.
Thomas B. Booth.

Inventor:
Henry H. Cummings
by Frederick L. Emery
Atty.

No. 739,778. PATENTED SEPT. 22, 1903.
H. H. CUMMINGS.
TARGET PRACTICE APPARATUS.
APPLICATION FILED JULY 10, 1903.
NO MODEL. 8 SHEETS—SHEET 7.

Witnesses:
Horace A. Crossman.
Thomas B. Booth.

Inventor:
Henry H. Cummings
by Frederick L. Emery
Atty.

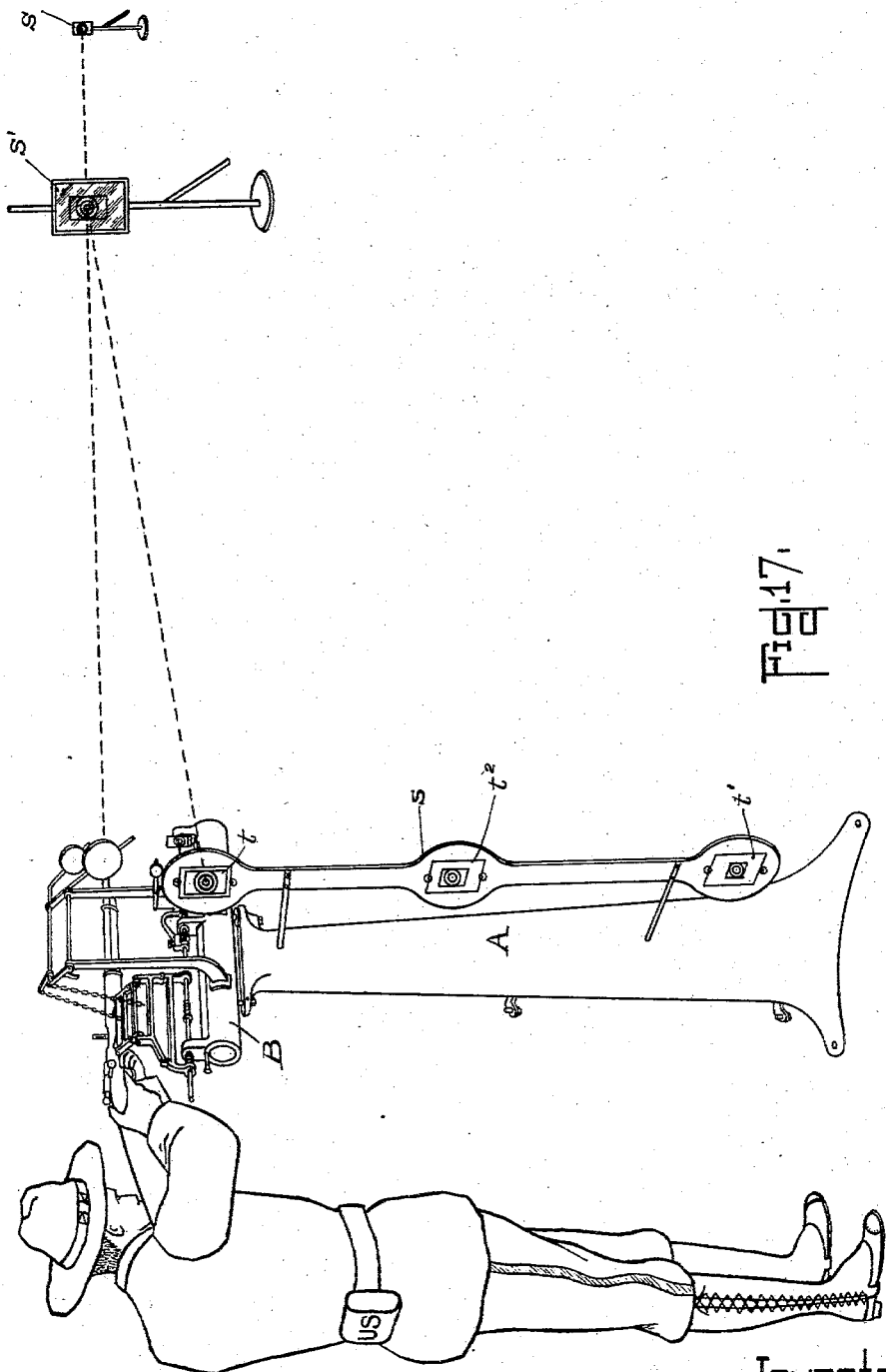

No. 739,778.    Patented September 22, 1903.

UNITED STATES PATENT OFFICE.

HENRY H. CUMMINGS, OF MALDEN, MASSACHUSETTS, ASSIGNOR TO SUB-TARGET GUN COMPANY, OF SACO, MAINE, AND BOSTON, MASSACHUSETTS, A CORPORATION OF MAINE.

TARGET-PRACTICE APPARATUS.

SPECIFICATION forming part of Letters Patent No. 739,778, dated September 22, 1903.

Application filed July 10, 1903. Serial No. 164,965. (No model.)

*To all whom it may concern:*

Be it known that I, HENRY H. CUMMINGS, a citizen of the United States, residing at Malden, in the county of Middlesex, Commonwealth of Massachusetts, have invented an Improvement in Target-Practice Apparatus, of which the following description, in connection with the accompanying drawings, is a specification, like letters on the drawings representing like parts.

My invention consists in improvements in target-practice apparatus, and is particularly concerned with target-practice apparatus employing a device or devices to be aimed and so associated with other means as to enable a marksman through their use to acquire skill and proficiency for any desired range without the issuance of any projectile from the aiming device and without the necessity of an extended space in which to conduct the practice.

My invention will be best understood from the following description, taken in connection with the accompanying illustration of one specific embodiment thereof, while its scope will be more particularly pointed out in the appended claims.

Figure 1:
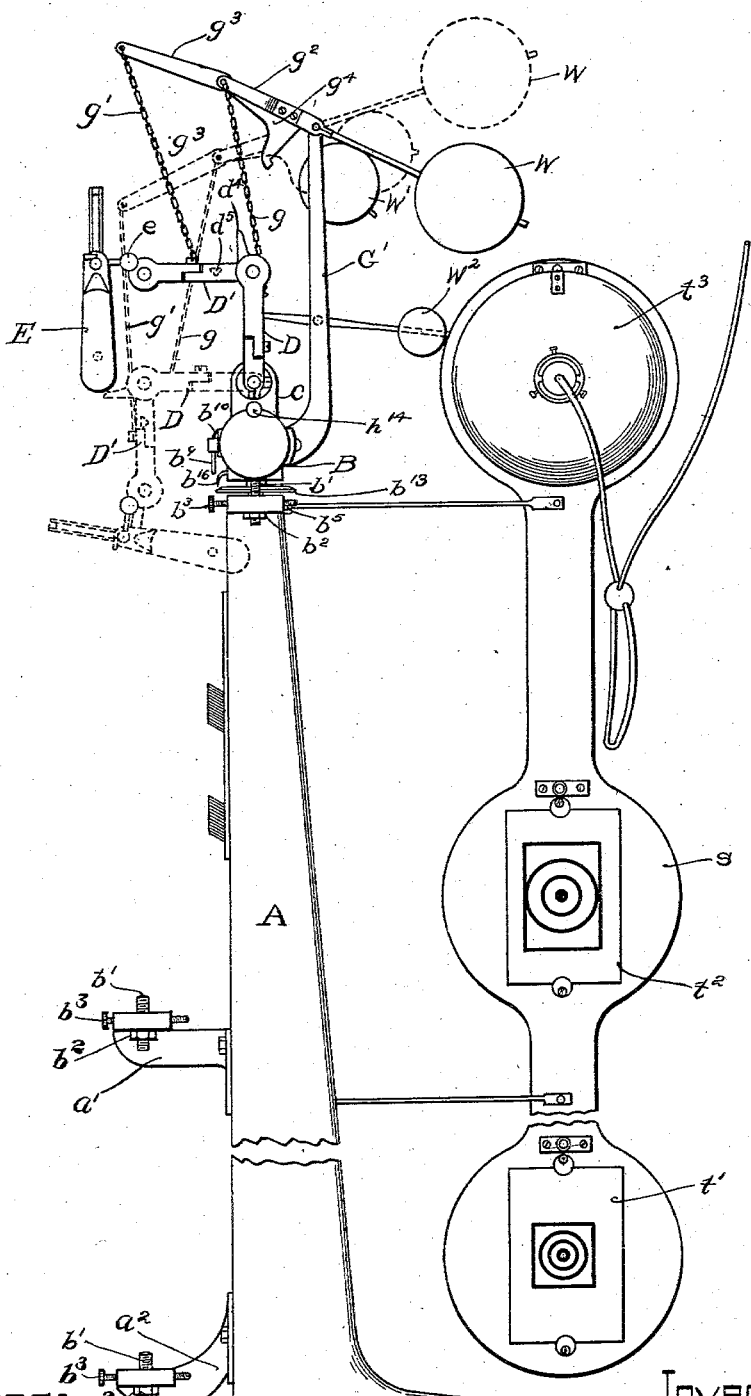
Figures 7, 8:
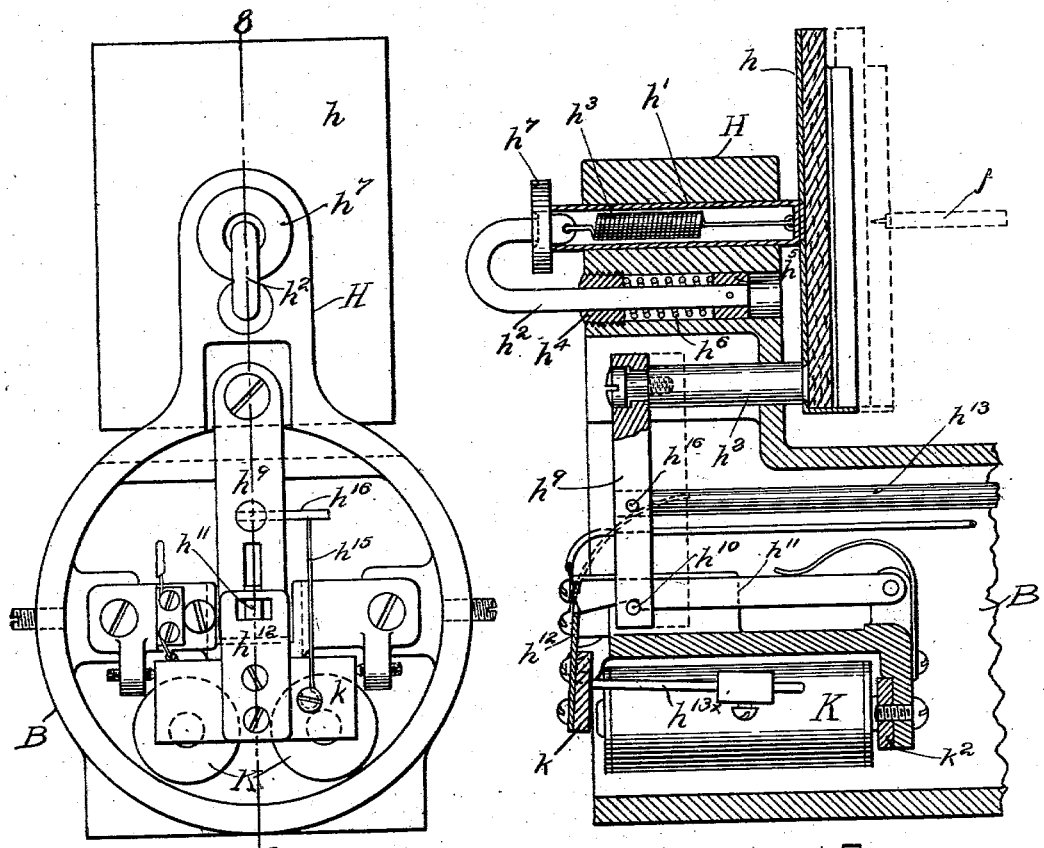
Figure 9:
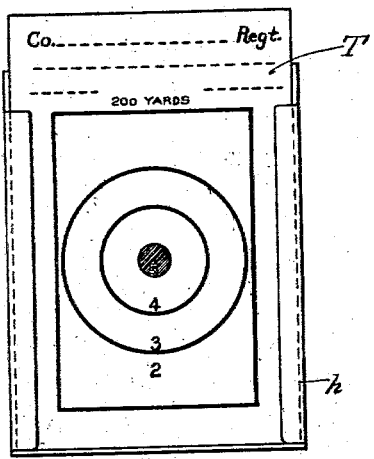
Figure 10:
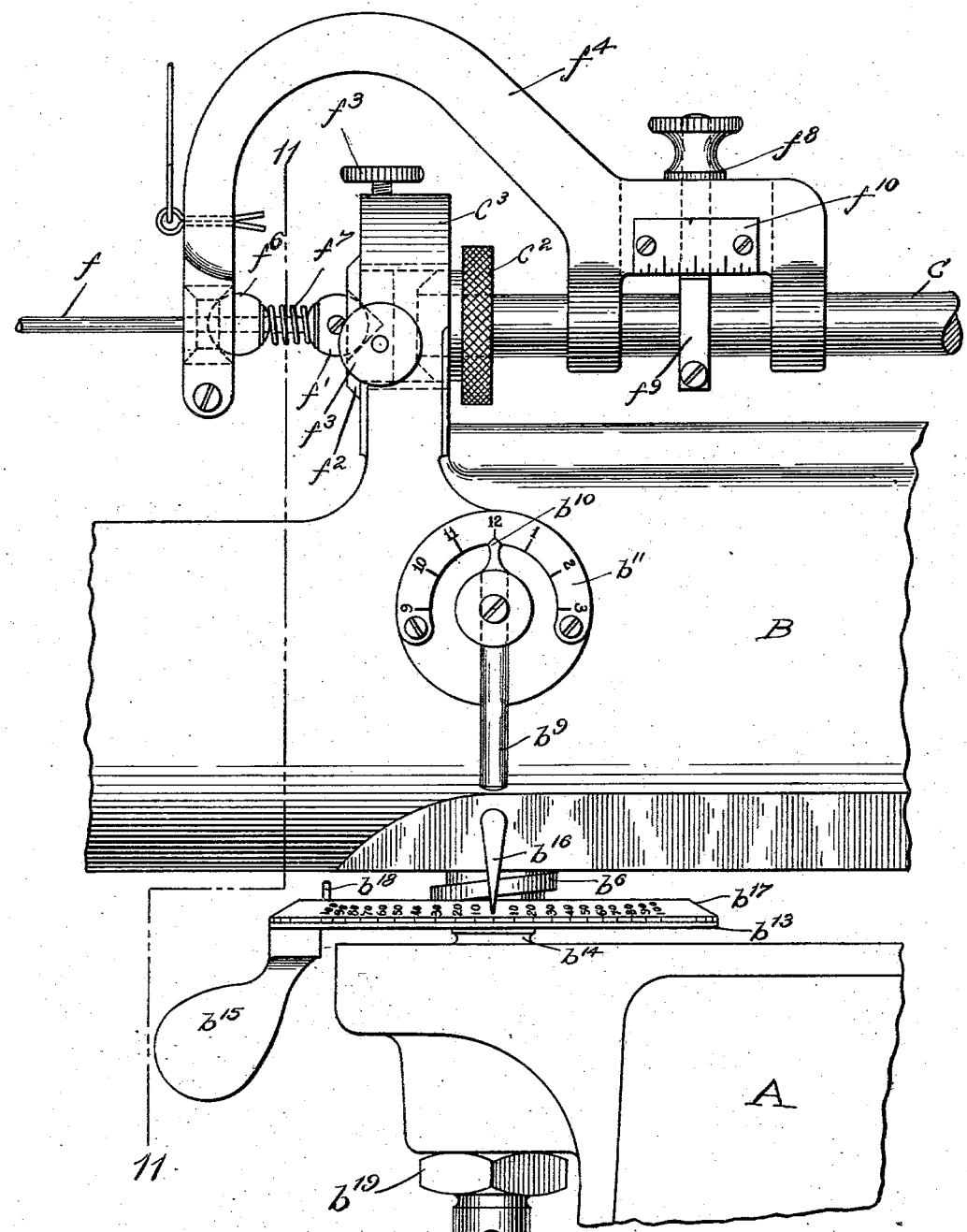
Figure 11:
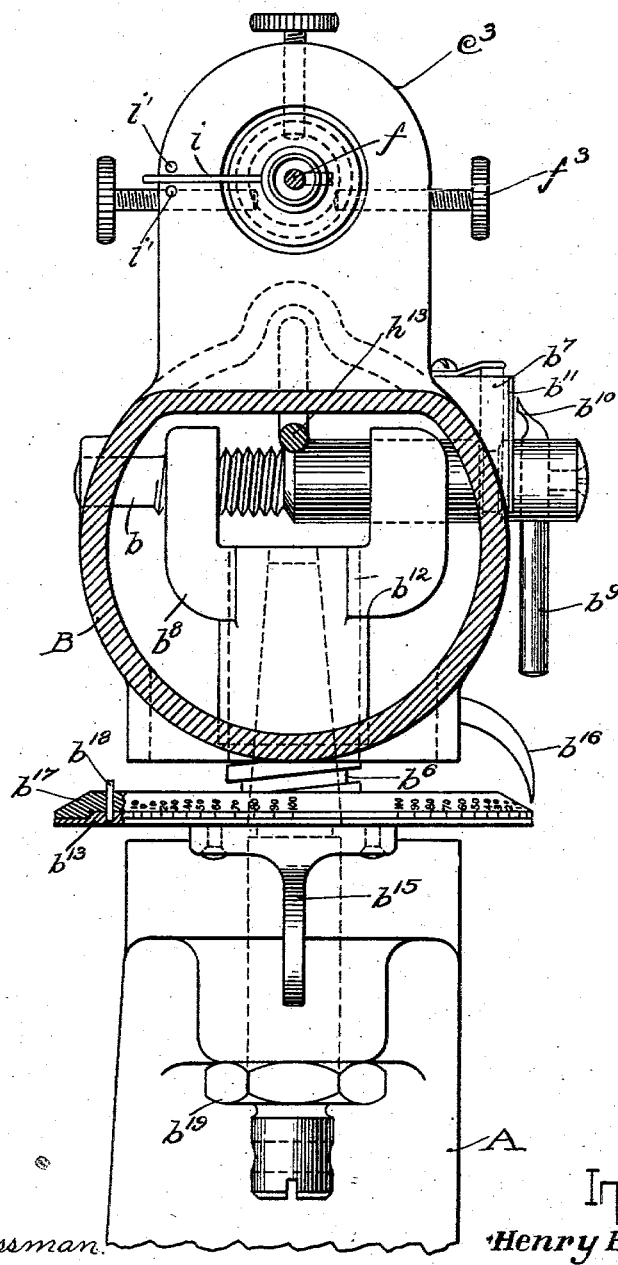
Figure 12:
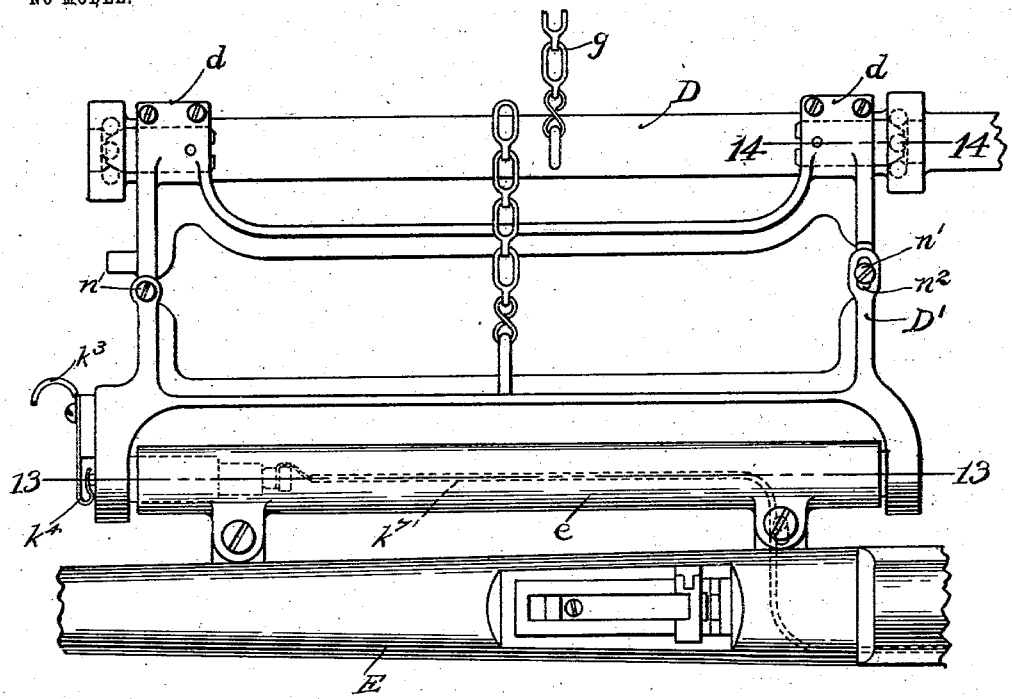
Figure 13:
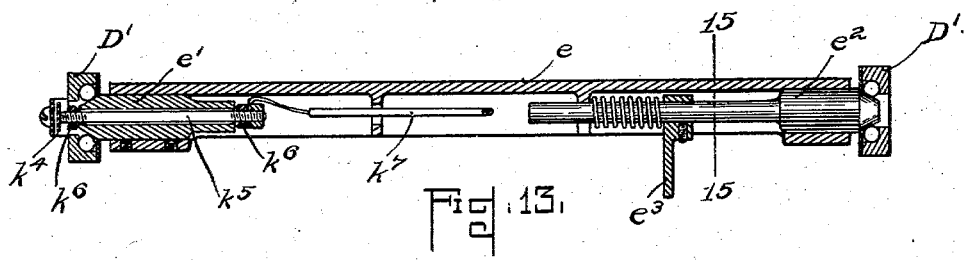
Figure 14:
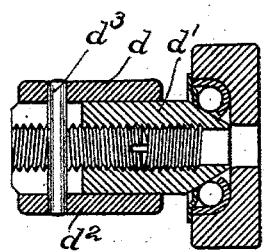
Figure 15:
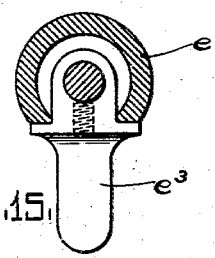
Figure 16:
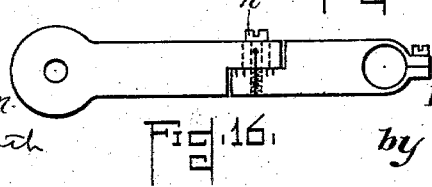

In the drawings, Figure 1 is an end elevation, partially broken away, looking from the rear of an apparatus made in accordance with my invention. Fig. 2 is a similar side elevation of the same. Fig. 3 is an enlarged side elevation, partially in section, of the supporting-beam and other parts related thereto. Fig. 4 is an enlarged section taken on the line 4 4 in Fig. 3, showing the universal connection between the gun-holder and the beam. Fig. 5 is a detail of the gun-trigger. Fig. 6 is a detail in section on the line 6 6 in Fig. 3, showing the construction of the dowel-pin and adjusting-screw. Fig. 7 is an end view of the electromagnetic recording mechanism. Fig. 8 is a sectional elevation of the same, taken on the line 8 8 in Fig. 7. Fig. 9 is a front elevation of the subtarget-holder with a subtarget in position. Fig. 10 is a side elevation, on an enlarged scale, of the beam-adjusting device and the connections between the gyratory rod and the recording-needle. Fig. 11 is a section on the line 11 11 in Fig. 10. Fig. 12 is a detail of the jointed gun-holder. Fig. 13 is a section taken on the line 13 13, Fig. 12. Fig. 14 is a section taken on the line 14 14, Fig. 12. Fig. 15 is a section taken on the line 15 15 in Fig. 13. Fig. 16 is a detail of the holder. Fig. 17 is a perspective view showing the method of employing the target-practice apparatus described.

In the drawings the aiming device to be described is mounted upon a supporting sub-base or standard A of a suitable height to afford to the marksman a normal or easy position of the gun, which has a considerable range of movement and is herein employed as the aiming device. At the top of the standard are provided suitable supporting means for adjustably supporting the gun beam or carrier B, the latter being herein shown as substantially horizontal and generally of a barrel or cylindrical shape excepting at its forward end, where it is flattened to provide the necessary space for the recording devices. The beam B is fulcrumed upon the stud $b$, Figs. 3 and 11, adjustment of the said beam in a vertical plane about its fulcrum being afforded by the adjusting-screw $b'$, provided with a check-nut $b^2$. Lateral adjustment of the said beam is permitted by means of the laterally-disposed adjusting-screw $b^3$, Fig. 6, in the standard A engaging the side of the dowel-pin $b^4$, fixedly secured to the under side of the beam and passing into a recess in the top of the said standard, which recess is provided with considerable clearance. Engaging the opposite side of the dowel-pin is the adjustable stop-screw $b^5$. By loosening the lateral adjusting-screw $b^3$ and tightening the stop-screw, or by reversing this operation, the beam may be given the slight lateral adjustment in a horizontal plane necessary for the initial alinement of the apparatus, the beam during such adjustment moving about the vertical threaded pivotal support $b^6$ under the fulcrum $b$. The dowel-pin $b^4$ is rigidly held from lateral movement by engagement therewith of the adjusting-screw $b^3$, while any tendency of the beam to tip forward is overcome by the spring S, interposed between a nut on the dowel-pin and the under surface of the overhanging edge of the standard A.

Referring now to Figs. 3, 10, and 11, the stud $b$ is rotatably mounted in suitable journals in the beam B and is prevented from lateral movement therein by the spring-pressed pin $b^7$ at the side of the said beam engaging a groove in the periphery of the stud. The beam receives support from the stud, the latter being supported in turn by the yoke $b^8$, one arm of which is engaged by a threaded portion upon the stud, another stud portion having a sliding fit within the other yoke-arm, so that by rotative movement of the stud the beam may be shifted laterally with respect to the supporting-yoke, and therefore with respect to the standard A. The exposed end of the stud is provided with a suitable hand-lever $b^9$ and an indicator $b^{10}$, the latter arranged in proximity to the graduated dial-plate $b^{11}$, by means of which the displacement of the beam through angular rotary movement of the stud may be estimated or indicated.

To provide a vertical adjustment for the yoke $b^8$, and therefore also a second vertical adjustment for the beam B, the lower part of the yoke $b^8$ forms, Fig. 3, a nut $b^{12}$, engaging with the threads upon the threaded pivot $b^6$, which is herein a prolongation of the dial-plate $b^{13}$, the said dial-plate and threaded pivot being rotatably mounted upon the tapered stud or rest $b^{14}$, secured to the fixed support or standard. The plate $b^{13}$ may be moved into any desired angular position by the thumb-piece $b^{15}$, such movement obviously effecting a raising or lowering of the nut $b^{12}$, likewise the yoke $b^8$ and the beam, with its fulcrum-support $b$. The dial-plate is provided with one or more sets of graduations, which pass in close proximity to the indicating-finger $b^{16}$ upon the beam as the said plate is moved about its axis. For a purpose hereinafter explained I have shown the dial-plate provided with three sets of graduations. The plate is intended to have a range of movement corresponding to the angular range of each set of graduations, and to bring any one set in proper relation to the indicating-finger $b^{16}$ without raising or lowering the stud $b$ above or below its normal position I have shown the graduated portion $b^{17}$ of said dial-plate as separate from the portion $b^{13}$, secured to the threaded part $b^6$, but adjustably mounted thereon, so that the same may be moved in one of three positions and secured in such position by the pin $b^{18}$ engaging a corresponding hole in the plate $b^{13}$. The base of the tapered supporting-stud $b^{14}$ is threaded and secured in the prolonged front end of the standard-top, wherein it may be vertically adjusted as desired and clamped in its adjusted position by the check-nut $b^{19}$.

At the rear upper part of the beam B, Fig. 3, is a suitable bracket $c$, in which is universally mounted by the gimbal-joint $c'$ (shown in detail in Fig. 4) the gyratory rod C, the opposite or forward end of said rod having a sliding collar $c^2$, which when the apparatus is out of use or undergoing adjustment may be moved into and within a corresponding aperture in the bracket $c^3$, also upon the beam, to fixedly secure the rod C from movement, as shown in Figs. 2 and 10. By the withdrawal of said collar $c^2$ from the bracket $c^3$, as shown in Fig. 3, the rod is capable of universal gyratory movement about the gimbal-support.

Slidably mounted upon rod C, by means of lugs engaging therewith, is one member or joint D of the articulated or jointed gun-support by which the aiming device is secured to the gyratory rod C. The supporting member D spans the bracket $c$, being provided between the lugs thereof and the opposing fixed collars $c^4$ and $c^5$, respectively, upon the rod C with comparatively weak springs $c^6$ and $c^7$, so that while the springs tend to maintain the joint D, and therefore the aiming device, in a definite position they do not offer any considerable resistance to the longitudinal sliding movement of D upon the rod C.

Joint D is pivotally secured to joint D' by ball-bearing connections, as shown in Figs. 12 and 14. Referring particularly to Figs. 12 and 14, joint D' is provided with suitable split clamping-brackets $d$, containing plugs $d'$, slidable therein and forming at their outer faces suitable cones for the ball-bearings. Said plugs are internally threaded and provided with adjusting-screws $d^2$, engaging a fixed pin $d^3$ in the said brackets $d$, the plugs $d'$ being slotted to avoid such pin. The bearings may be adjusted or may be loosened to separate the two yokes by inserting a screw-driver through the central opening in the bearings and the plug and changing thereby the position of the bearing adjusting-screw $d^2$. The joint D, Fig. 1, is provided with a lug $d^4$, adapted to engage a stop $d^5$ on the joint D' to limit the relative movement of the two joints.

I have herein shown the aiming device as consisting of a gun E of conventional type, provided with the rigidly-attached and laterally-disposed bracket $e$, Figs. 12 and 13, the latter being provided at one end with a fixed cone $e'$ and at the other with a spring-pressed sliding cone $e^2$, provided each with bearing-surfaces for balls normally retained in oppositely-disposed ball-races upon the yoke D'. My invention comprehends any suitable aiming device, and in this specific embodiment thereof any desired type of gun may be employed. By the construction described several different types of guns may be interchangeably used with one single apparatus, each gun being provided with a rigidly-attached bracket $e$, similar to that already described. To remove the gun from its jointed support, the cone $e^2$ is withdrawn from its ball-bearing by pressing the thumb-piece $e^3$ upon the spring-pressed shank thereof to compress the spring, by which the entire gun may be freed from its connections and may be removed therefrom to be replaced by another, if desired. To replace the gun, it is only necessary to place the cone $e'$ within its bearing, press the thumb-piece $e^3$, and allow the cone $e^2$ to seat itself in its bearings.

By means of the jointed or articulated connections described between the gun and the beam, even with the gyratory rod stationary, as in Figs. 2 and 10, the gun may be freely and easily moved within wide limits, as will be more readily seen from the plurality of positions indicated in Fig. 1, and it may be easily raised and lowered to any desired position to provide, in effect, a positioning movement of the gun while in the hands of the marksman without affecting the position of the gyratory rod. The facility of movement is also greatly increased by the longitudinal sliding movement upon the rod C, which permits the gun to be moved forward and backward relatively to its support, also without affecting the gyratory rod. When the rod C is freed from the bracket $c^3$, as shown in Fig. 3, the gun in addition to its compound positioning movement relatively to the said rod is also capable of universal gyratory or aiming movement with the rod about its universal support, the latter following in its gyrations the gyrations of the gun, there being at all times, however, a fixed relation between the aiming or pointing of the rod and the gun as the latter is moved ordinarily about the shoulder of the marksman as a fulcrum in the act of aiming at a distant object. It will also be evident that while the gyratory rod serves to indicate the direction of trajectory of the firearm the marksman is afforded no conscious aiming-point of rest during the act of aiming and the firearm has, in effect, a restless support. In order to maintain a fixed relation between the rod and the gun at all times, so that when the latter is aimed at a distant object in one of its positions and with its jointed connections in one relation, the gyratory rod may point in precisely the same direction as when the gun is aimed at the same distant object in another of its positions with its jointed connections in a different relation, or, in other words, in order that a gyratory movement of the rod C shall be effected only through an aiming or gyratory movement of the gun and not through a positioning movement thereof the several pivotal axes or axes of articulation connecting the rod and the gun, together with the rod and gun themselves, instead of being parallely arranged are made to converge at a point the same distance away as the bull's-eye of the intended target or other object aimed at. The convergence of the several axes referred to permits the gun to swing from side to side or in the arc of a circle, describing the path of an element of a cone toward the apex of which the several axes are directed and while pointing at the same distant object without varying the position of the gyratory rod, the axes of articulation and the axis of the gyratory rod being, in effect, axes of revolution about which and along which the gun is permitted to move in its positioning movement without necessary influence upon the position of the indicating parts.

To provide an indication of the aim of the gun, I employ aim-indicating means, such as the indicating-needle $f$, connected to the rod C, and thereby to the gun, to move with and follow the gyrations of the latter and at the desired time indicate its aim or position with reference to a suitable relatively fixed object, which in order to provide not only an indication, but a permanent record as well, herein consists of a subtarget to be marked or punctured by the needle. The needle $f$, Figs. 3 and 10, is provided with a spherical bearing $f'$, seated in a suitably-shaped bearing-seat $f^2$, adjustably secured within the bracket $c^3$ upon the beam B by three centering-screws $f^3$. The needle $f$ is connected with the free end of the rod C by the sliding yoke $f^4$, provided with the bearing-recess $f^5$, in which is seated the ball $f^6$, slidably mounted upon the needle and spring-pressed against its seat by a spring $f^7$, interposed between the said ball $f^6$ and the ball $f'$. It will be seen by referring to Figs. 2 and 3 that any movement of the rod C about its universal support is reproduced, but to a different degree, in the needle $f$ through the yoke connection $f^4$, the relation between the movements of the rod and the needle being dependent upon the position of the sliding yoke $f^4$ upon the rod and needle. To vary the relative movement of the needle, the sliding yoke $f^4$ may be adjusted to any desired position upon the rod C within suitable limits and may be there secured by means of the clamping-screw and thumb-nut $f^8$, the spring $f^7$ maintaining at all times accurate and sufficient seating or holding of the said spheres $f'$ and $f^6$ in their respective seats. Secured to the rod is an index-finger $f^9$, opposed to a graduated scale $f^{10}$ upon the yoke, whereby the variation from a normal position thereof may be indicated and the amount by which the movements of the needle $f$ relatively to that of the rod C depart from that for which the apparatus is normally adjusted may be determined.

In order that the handling of the firearm during aiming may at all times be an exact simulation of that when the firearm is employed in actual practice and that the marksman may be relieved during aiming of the weight of the connected following parts, there is provided suitable counterbalancing means for such parts consisting of a series of counterweights, so that each weighted part attached to the gun is balanced, and no matter what position is given the gun the marksman is encumbered, as in actual practice, substantially only with the weight of the gun itself. Referring particularly to Figs. 1, 2, and 3, the joints D and D' are secured by flexible connections, such as the chains $g$ and $g'$, respectively, to the arms $g^2$ and $g^3$, the former, $g^2$, being journaled in the vertical supports G and G', secured to the beam B, and the latter, $g^3$, having a journal-support in suitable arms partaking of movement with the arm $g^2$. The arms $g^2$ and $g^3$ are provided with suitable counterweights W and W', adapted to compensate for the weight of the said joints and their connections. In order that the freely-movable gun may have a rest when not in use or when the apparatus is undergoing adjustment, the arm $g^2$, Fig. 1, is provided with a shoulder $g^4$, engaging with the support G', which acts as a stop to constitute a gun-rest, so that when released by the marksman the gun is allowed to hang suspended in the position shown in dotted lines, Fig. 1, where it may again readily be reached and lifted for use into any desired position, such as shown in full lines in Fig. 1, the shoulder $g^4$ withdrawing, as shown, from the rest or support C'. Connected to the yoke $f^4$, Figs. 1 and 3, I have also provided the counterweight $W^2$, adapted to compensate for the weight thereof and that of the gyratory rod and connected parts, so that the entire system of connections herein described is effectively counterweighted for all positions of the gun.

In front of the preferably-pointed end of the marking-needle $f$ is arranged a target-receiver $h$, Figs. 3, 8, and 9, adapted to receive a subtarget slip or card, the size and shape of which may be varied as desired. One form of target is shown, Fig. 9, at T, it being inserted into the holding-slots therefor in the receiver. In order that one target may be replaced by another similar one and that the outlines of the latter may be presented to the marking-needle in precisely the same relation as in the case of the first target and that the same may be true of any number of successively-used subtargets, the sides of the subtargets are accurately gaged with reference to the marking thereon and have an accurate fit within the receiver-slots, positioning-points being thus provided between the holder and targets to maintain a fixed target relation to the indicating-needle.

The target-case $h$, Figs. 7 and 8, is secured to a tubular sleeve $h'$, slidably mounted in a bracket H at the end of the barrel B to bring the target directly opposite the recording-needle. The sleeve is secured to the overturned end of the rod $h^2$ by the spring $h^3$. The rod $h^2$ slides within the bushing $h^4$ in a suitable recess in the bracket H and is provided with the collar $h^5$, also slidable in said bracket, interposed between which and the bushing $h^4$ is the target-actuating spring $h^6$, the sleeve $h'$ and rod $h^2$ being shown in their rearward positions in Fig. 8 and the spring under compression ready to throw the target forward when released to throw the latter against the needle-point and to record the aim therefor by the mark or impression thus made. When the spring is released, the forward movement of the rod $h^2$ is limited by the washer or plate $h^7$, attached thereto, which strikes against the bracket, the movement permitted being sufficient to bring the target into its dotted-line position almost but not quite in contact with the point of the recording-needle. The momentum of the target-case is sufficient, however, to carry the target against the point of the needle for the necessary record, the spring $h^3$ yielding to permit this excess of movement or overthrow of the target, but also immediately thereafter retracting to pull the target back and clear it from the needle. By this means the record is effected instantaneously, and any movement of the needle immediately following the similated firing cannot mar the target or injure the needle-point.

For setting and releasing the target the latter is provided near its lower end with the bar $h^8$, having the depending arm $h^9$, provided in its forked end with the pin $h^{10}$, adapted to engage with the spring-pressed pivoted notched arm $h^{11}$ when the spring $h^6$ is compressed and the target set into its rearward position and to maintain or lock the target in such position until the pin is released by withdrawal of the arm. The notched arm $h^{11}$ is adapted to be held in the locked position (shown in Fig. 8) through the engagement of a shoulder on its outer end with the pivoted catch $h^{12}$, normally thrown into its catching position by the weighted arm $h^{13}$, but adapted to be withdrawn to release the notched arm $h^{11}$ by the armature $k$ of the electromagnet K. When the magnet K is energized, the armature $k$ is attracted and the catch $h^{12}$ withdrawn from the shouldered end of the arm $h^{11}$. The notch in the latter engaging the pin $h^{10}$ is slightly rounded, so that the pin forces it upward when freed, permitting the release of depending arm $h^9$ and the target-holder, the latter being thrown forward into the dotted position by the spring $h^6$. When it is desired to reset the target in its full-line position, use is made of the resetting-rod at $h^{13}$, secured to the depending arm $h^9$ and extending lengthwise the beam B to present a thumb-piece $h^{14}$ directly in front of the operator or marksman, by whom it may be manipulated during the target practice. When the resetting-rod $h^{13}$ is slid forward, it forces the target backward away from the needle and brings the pin $h^{10}$ into engagement with the notched arm, which is thereupon secured and held by the weighted catch $h^{12}$.

To prevent the sticking of the armature $k$ to the magnet owing to residual magnetism and which may resist the counterbalancing tendency of the weighted arm $h^{13}$, the catch $h^{12}$ is provided with the spring $h^{15}$, Fig. 7, extending upward and beneath a laterally-extended pin $h^{16}$ upon the depending arm $h^9$. When the arm is thrown forward on the release of the target, the pin presses against the spring $h^{16}$ to force the armature $k$ away from its magnets and compel the separation thereof.

The target setting and releasing devices are preferably concealed from view within the barrel B, which at its end is provided with a removable cap $h^{17}$, Fig. 3.

At the opposite end of the barrel and accessible through a similar movable cap are located two dry batteries $k'$ to provide a source of current for actuating the magnet K. One terminal of the batteries is connected, as diagrammatically indicated in Fig. 3, to one terminal of the magnet, the other magnet-terminal being grounded to the frame of the machine through a connection (not shown) with the magnet-yoke $k^2$. The remaining battery-terminal is connected through a wire $k^3$, Figs. 3 and 12, with a spring-clip $k^4$, Figs. 12 and 13, secured to the joint D' of the jointed gun-holder and so located as to contact with a conducting-pin $k^5$ upon the bracket $e$ when the latter has been placed within the jointed holder, thus forming a self-closing connection. The conducting-pin $k^5$ passes through the bearing-cone $e'$ in the bracket $e$, but out of electrical contact with the same, being secured therein by means of insulating-collars $k^6$, so that it is insulated from the bracket $e$, but is permitted to extend through the ball-bearing $e'$ to contact with the aforesaid clip $k^4$. At its opposite end it is electrically connected to a wire $k^7$, which passes into the gun or other firearm, Fig. 12, where it is connected to an insulated contact-piece $k^8$, (see Fig. 5,) the latter being within the path of a finger $k^9$, which may be moved by the marksman to close the circuit, preferably by pulling the gun-trigger. The finger $k^9$ being also grounded upon the machine, it follows that when the trigger is pulled and the circuit closed at $k^8$ the magnet-circuit is completed and the magnet energized to release the target and cause a record of the position of the recording-needle thereupon.

This apparatus when used is set up in any convenient position, either indoors or out of doors, where the gun may be sighted at some object, such as a main target. When so set up, the gyratory rod C is first locked against movement by sliding the collar $c^2$ within the recess of the bracket $c^3$. In this condition the beam is adjusted by the vertical adjusting-screw $b'$ and the lateral adjusting-screw $b^3$ until the gun points accurately to the bull's-eye of the target or object sighted, the heel of the marking-needle $f$ being then adjusted by the centering-screws $f^3$ until the marking-needle at the same time points to the center of the bull's-eye of the miniature target. Suitable cross hairs or sights may be employed for verifying the accuracy of this preliminary adjustment of the gun, if desired, although not ordinarily required. Since the collar $c^2$ closely fits its coöperating aperture in the bracket $c^3$, the insertion of the former within the latter directs the aiming device, indicating-needle, and subtarget all into a certain and predetermined relation with one another and there maintains them during the preliminary adjustment of the apparatus. It will be evident that this same relation may be defined and repeated for any number of successive adjustments, and since the indicating-needle will ordinarily seldom require adjustment relatively to the subtarget the former may by these means be almost invariably brought directly opposite the center of the bull's-eye of the subtarget and there maintained during adjustment of the gun relatively to the main target.

The bearing-ball $f'$ is provided with means, as the lateral arm $l$, Fig. 11, projecting between the two pins $l'$ upon the bracket $c^3$ to prevent rotative movement of the needle without impeding free gyratory movement thereof. This preserves the marking-needle always in the same rotative position, so that if bent slightly the apparatus may still be adjusted quickly and accurately.

When the sliding collar $c^2$ is withdrawn from the bracket $c^3$, the apparatus is ready for use. The marksman, taking the gun in his hands exactly as when firing, aims at the distant object or target, the movements of the gun in aiming relatively to the distant object being accurately reproduced by the movements of the needle $f$ relatively to the subtarget, and at the moment the marksman pulls the gun-trigger the subtarget is released by the electromagnetic devices and moved instantly to record thereupon the accuracy of the aim at the moment of such simulated firing. The marksman now resets the target-holder by the resetting-rod $h^{13}$, removes the subtarget-card, which may be preserved as a permanent record in the accuracy of aim, inserts a fresh target, and continues his practice, the same target being employed for several aims or a fresh target used in each case, as may be desired. Suitable target-receptacles $t$ and $t'$ for the reception of used and unused targets are provided in the side of the standard A, Figs. 1 and 2.

Referring to Figs. 2 and 3, the marking-needle $f$ passes through a rectangular limiting-frame $m$, mounted upon the beam in front of the target-holder. This frame is of such shape and proportions as to prevent the marking-needle from describing a movement which would carry its point outside the marking limits of the miniature target. When the movement of the needle is thus limited by the frame $m$, the spring $f^7$ permits the unseating of the spherical bearing $f$ to allow further gyratory movement of the rod $c$, and the gun within suitable limits thus constituting a yielding connection, allowing an excess of movement of the gun over the restricted movement of the needle.

Marksmen are accustomed to practice at short ranges in a standing posture, at limited ranges in a kneeling posture, at long ranges in a prone position, and to permit these various postures with my apparatus I have provided the standard A with a lower shelf $a^2$ for the prone position and an intermediate shelf $a'$ for the kneeling position, upon either of which the barrel B, with all the attached gun-holding parts, may be readily placed when desired. Each shelf is provided with a tapered stud or gun-rest similar to $b^{14}$, a vertical adjusting-screw similar to $b'$, and a lateral adjusting-screw similar to $b^3$, so that to place the apparatus in condition for use in the kneeling position it is only necessary to loosen the lateral adjusting-screw $b^3$, remove the beam, with its threaded pivot $b^6$, from the taper stud $b^{14}$ and place it upon the corresponding stud upon the intermediate shelf $a'$, where the beam may be initially adjusted, as heretofore described.

The several supporting-shelves, with the beam or carrier-holding device, constitute means for varying the relative distance between the marksman's support and the aiming device, the marksman's support being the same or a different one from that upon which the standard A rests. I preferably employ these in addition to those means already described for adjusting the aiming device in positioning the same or in adapting the same to the varying heights of different marksmen in the same aiming posture, the performance of these functions being effected by the jointed or articulated holder.

For competitive contests it is often desirable to give a marksman either a positive or negative handicap. This may be done by adjusting the yoke $f^4$ to an abnormal position on the rod $c$, so that the deviation of the needle $f$ from the bull's-eye of the subtarget T to correspond to a deviation of the line of given sight from the bull's-eye of the main target may be greater or less than normal. This variation, which constitutes, in effect, a handicap, will be indicated on the graduated scale upon the yoke, the scale reading to yards, corresponding to the handicap, or being simply arbitrary in its indications.

Owing to defects in eyesight, it happens that some marksmen will habitually shoot too high, others too low, and still others to the right or left of the bull's-eye. To correct such errors of eyesight and eliminate the results thereof from the recorded aim, the following attachments are provided, which may be used when desired. As heretofore explained, movements of the graduated plate $b^{17}$ tend to raise or lower the beam. If after the beam has been adjusted so that both the recording-needle and the gun simultaneously point to the centers of their respective targets the beam is then slightly raised, it is obvious that the gun must be sighted high in order that the record may be made upon the bull's-eye of the miniature target, and likewise when the beam is lowered the gun must be sighted low for a corresponding record. If then a marksman habitually sights the gun too high by twenty-five yards, for example, the dial $b^{17}$ may be turned left-handedly from its zero position, which corresponds to normal eyesight, through twenty-five of its graduated units, which will raise the beam, and therefore bring the recording-needle opposite the bull's-eye of the miniature target when the marksman has sighted the gun as it appears to him upon the center of the distant target. Likewise if another marksman is in the habit of sighting the gun too low the dial should be turned right-handedly to correct the error in yards which his deficiency in eyesight is known to introduce. Since the sights upon the various standard makes of guns are largely arbitrary, and in this respect the various guns differ among themselves, I have provided a plurality of scales upon the dial $b^{17}$, so that with the apparatus herein shown three different firearms for each of which is provided a scale may be interchangeably employed in connection with the dial-plate. When one gun is in use, the scale upon the plate corresponding to that gun is employed. When that gun has been removed and replaced by another, the dial $b^{17}$ may be moved upon its plate $b^{13}$ to bring the scale corresponding to such gun under the indicator $b^{16}$. Deficiencies in eyesight also cause different marksmen to aim either to the right or to the left of the bull's-eye, and to correct this defect I employ the lateral adjustment afforded by the stud $b$. By moving the stud either left-handedly or right-handedly through the hand-lever $b^9$ the beam may be adjusted either to the right or the left to correct for errors which naturally cause the aim to deflect either to the right or left. The dial-plate $b^{11}$ may be graduated in any desired manner; but since it is customary among marksmen to speak of their habitual tendencies to strike the bull's-eye at one or two or three o'clock or eleven, ten, or nine o'clock, according as their defects in eyesight cause them to aim in different degrees to the right or the left of the bull's-eye, I have graduated the plate to correspond to the dial of a clock, so that by setting the pointer $f^{10}$ at one o'clock the marksman tends to strike the target at one o'clock and may correct his tendency to strike the target at eleven o'clock. Thus the tendency to strike the target at one side or other of the bull's-eye can be corrected by setting the pointer to a corresponding position in the opposite direction.

By the adjustments described natural errors of eyesight may be eliminated when desired and the records be placed upon a comparative basis to show only errors due to inexperience and carelessness. In this manner each marksman rapidly comes to understand his own habitual defects in eyesight and learns to estimate them and soon becomes proficient in marksmanship without the aid of the corrective attachments.

In Fig. 17 I have shown the target-practice apparatus employed sighting at a distant target S. In rooms, armories, or confined spaces where full range is not feasible a considerable space may be saved by employing a mirror S', located at half the range distance and reflecting to the marksman the image of a target located at some other point. In the embodiment of my invention herein described I have shown secured to the standard A a frame s, carrying three dissimilar targets, the upper and the largest one, t, corresponding to the shortest range and the standing position of the marksman, the lowest and smallest one, t', corresponding to the longest range and the prone position of the marksman, and the intermediate one, $t^2$, to the kneeling position and intermediate range. The mirror S' may be set in such a position that the marksman aiming the gun in any position will see the image of the target corresponding to that position. In order to give clearly a distinct image of the target to the marksman, I preferably employ targets marked upon some transparent medium, such as ground glass, and make use of an adjustable illuminating device placed at the rear of the target, so that the illuminated surface of the target is seen in the mirror by the marksman. For the illuminating device a shaded incandescent lamp, such as $t^3$, Figs. 1 and 2, may be employed, connected with a suitable current source by a flexible conductor of sufficient length so that the lamp may be moved from its position behind one target to the position behind another when desired.

The main targets employed for the different ranges correspond, preferably, to standard targets customarily used for such ranges, but proportionately reduced for the actual range for which the target-practice apparatus is adjusted, subtargets corresponding to the main targets, but proportionately reduced in size, being employed in connection with the main target for each of the different ranges.

Since accurate work, as stated, requires the joints of the jointed holder to be so constructed as to have their axes brought to convergence at a fixed distance from the gun, which distance is the range employed, this limits the use of such a target-practice apparatus to a fixed range unless the jointed holder is replaced by another holder constructed for a different range. This ordinarily, however, is no disadvantage, since the equivalent of variable ranges may be had by a suitable reduction of the targets corresponding to such different ranges to targets adapted for use with the target-practice apparatus at a fixed range, as has already been described. In order, however, that when desired the apparatus may be employed upon any length of actual range at will, I may construct the holder parts so as to be adjustable to such different ranges, as best shown in Fig. 12. The holder D' is shown as pivoted at n, and the opposite side of the holder may be adjusted to vary the angular relation of the axes of the joints, being secured by means of a set-screw n' upon one part of the joint and engaging the slot $n^2$ in the other member of said joint. A micrometer-scale between the two overlapping edges of the two joined members (see Figs. 1 and 16) may be employed to accurately indicate the exact angular relation between the joints at any given time. A similar adjustment may be employed, as shown in Fig. 12, upon the bracket e, although the overhang of the gun upon the bracket is so short that adjustment at this point would ordinarily be unnecessary. The remaining joint D of the jointed holder, Fig. 3, is provided with a pivotal adjustment similar to that described in connection with D'.

It will be obvious that my invention is in no respect limited to the particular details of construction which I have herein shown, nor to the relative arrangement of parts described, but that the same may be modified within wide limits without departing from the spirit thereof.

I claim—

1. A target-practice apparatus, comprising an aiming device having an aiming movement, whereby the same may be deflected toward or from a main target or other like object, a follower to follow said aiming movement, an articulated connection between said device and said follower to permit a positioning movement of the former relatively to the latter, the axis or axes of articulation converging with the axes of said aiming device and follower substantially toward a common point.

2. A target-practice apparatus having an aiming device, following means movably connected therewith to follow the aiming movements thereof, and means to define the relative alinement of said aiming device and following means to permit them repeatedly to assume one and the same relative alinement for preliminary adjustment of the apparatus.

3. A target-practice apparatus comprising an aiming device having a comparatively unrestricted aiming movement, a movable indicating member connected with and to follow the aim of the aiming device, and means to restrict the range of movement of said indicating means within a definite area to permit of excess of movement of said aiming device over said indicating means.

4. An aiming device, having a comparatively unrestricted aiming movement, a movable indicating member, means connecting the same with and to follow the aim of said aiming device, means to restrict the range of movement of said indicating member within a definite area, and a yielding connection between said indicating member and aiming device to permit excess of movement of the latter over the former.

5. A target-practice apparatus comprising an aiming device for aiming at a target, said device being adjustable to accommodate the various heights of different marksmen in the same posture, following and indicating means to follow and indicate the aim of said device, a support for the marksman, and additional means to vary the relative vertical distance between said support and aiming device to accommodate a marksman in different aiming postures.

6. The combination with a target-practice apparatus adapted to follow the aim of an aiming device when aimed at an object, of reflecting means arranged in front of said device to enable the latter to be pointed in a direction other than toward such object and aim-indicating means coöperating with and to record the accuracy of aim of said aiming device as determined by said reflecting means.

7. A target-practice apparatus, provided with a device having an aiming movement for aiming at a target, or like object, and having also a positioning movement while in the hands of a marksman, a follower therefor to follow and indicate the aim thereof by movement relative to a reference object, said follower performing its relative indicating movement only upon the aiming movement of the said aiming device.

8. A target-practice apparatus, comprising an aiming device, a support about which said device has a gyratory movement, and means connecting said device to said support to permit also of a lateral and longitudinal positioning movement relatively thereto while in the hands of the marksman.

9. A target-practice apparatus provided with a support, an aiming device having an aiming movement thereon, means also to permit of freely raising and lowering the said device to give a positioning movement while in the hands of the marksman, and a follower to follow the aiming movement with reference to a fixed object and following said aiming movement only.

10. A target-practice apparatus provided with a support, an aiming device having an aiming movement thereon, means also to permit of freely moving said device forward or backward relatively to said support to give a positioning movement while in the hands of a marksman, and a follower to follow the aiming movement with reference to a fixed object and following said aiming movement only.

11. A target-practice apparatus, having an aiming device for aiming at a target or like object, a restless support for said device and following means to follow the aim thereof with relation to a reference object.

12. A target-practice apparatus, provided with an aiming device, a follower, an indicator having a support separate from the support of said follower, and an adjustable connection between said follower and indicator to vary the relative movement between the latter and said aiming device.

13. A target-practice apparatus, having an aiming device and following means to follow and indicate the aim thereof, said device having a positioning movement relatively to said following means about one or more axes of revolution, the latter converging with the axis of the aiming device substantially toward a common point.

14. A target-practice apparatus provided with an aiming device having a restless support for aiming at a main target, means connected with the device itself for indicating the accuracy of aim and means to relieve the marksman of the weight of the connecting parts when in the act of aiming the said device.

15. A target-practice apparatus provided with an aiming device for aiming at a main target, a subtarget, following means to follow the aim of the said device and indicate the same with reference to the subtarget and means to relieve the marksman of substantially all but the weight of said device when in the act of simulated firing.

16. A target-practice apparatus, having an aiming device, an indicator for following and indicating the aim thereof relatively to a reference object, means to define the relative position of said indicator and reference object to permit them repeatedly to assume the same relative position for preliminary adjustment of the apparatus.

17. A target-practice apparatus, having an aiming device, an indicator for following and indicating the aim thereof relatively to a reference object, and means to define the relative position of said aiming device, indicator and reference object to permit them to repeatedly assume one and the same relative position for adjustment of the apparatus, and to maintain such relative position during adjustment.

18. A target-practice apparatus, having an aiming device for aiming at a main target or like object, following means to follow and indicate the aim of said device relatively to a reference object, a support upon which said device and following means are carried, means to effect relative adjustment of said main target and target-practice apparatus, and means to define the position of said aiming device and following means upon said support during adjustment to permit the repeated assumption thereby of the same position on said support.

19. A target-practice apparatus provided with an aiming device adapted to be aimed at a main target, recording means to record the aim thereof comprising a subtarget, and a recording member relatively movable one toward the other, one of which follows the movement of the device during aiming, propelling means to bring said recording member in contact with said subtarget, means for restraining said propelling means, electromagnetic releasing devices connected with the trigger of the aiming device to release said propelling means and means to reset the movable member.

20. A target-practice apparatus provided with an aiming device adapted to be aimed at a distant target, means for effecting a permanent record of the aim thereof, comprising a recording member, and a target-holder, one of which follows the movement of the device during aiming, said target-holder being provided with positioning means for maintaining successively a series of targets having each coöperating positioning means in the same relative position to the recording member.

21. Target-practice apparatus comprising a device for aiming, following means for engaging and following the aim of the same, a recording medium, such as a subtarget and means for moving said medium toward and against said following means to record the accuracy of the aim.

22. Target-practice apparatus having an aiming device, indicating means comprising an indicating medium and an indicating member, movable one relatively toward the other to effect an indication of the aim, propelling means to move the movable member and means to permit the completion of such movement through the momentum thereof.

23. A target-practice apparatus, having an aiming device, indicating means comprising an indicating medium and an indicating member one movable relatively toward the other to effect an indication of the aim, propelling means to cause initial movement of the movable element, and means for completing the indicating movement of said element independently of said propelling means.

24. Target-practice apparatus comprising a device for aiming at a main target, recording means comprising a subtarget and a recording member, one of which is adapted to follow the movements of the device during aiming and electromagnetic means for recording the relative position of the recording member and subtarget at the time of simulated firing.

25. A target-practice apparatus comprising an aiming device, having an aiming movement, and means for simulating the act of firing, a follower to follow said movement, a movable target, and means for moving said target toward said follower to effect a record of the aim thereon at the time of simulated firing.

26. Target-practice apparatus provided with an aiming device for aiming at a target, a gyratory supporting member therefor having a universal support near one end and means near the other end thereof for securing the same against gyration for adjustment of said apparatus.

27. A target-practice apparatus having an aiming device, a support therefor, connection between said device and support to permit the aiming of the former at a main target when in the hands of a marksman, a follower to follow and indicate the aim of said device, and a rest for said device connected with said support.

28. In a target-practice apparatus a subtarget, a support therefor, a sliding connection between said target and support and means for sliding said target upon said support to effect a record of the aim upon said target.

29. In a target-practice apparatus an aiming device, a movable subtarget, setting means for said target and releasing means also therefor operable at the time of simulated firing.

30. An apparatus of the class described having a device to be aimed at a distant target and following and aim-indicating means, a single supporting member therefor, a standard upon which said member is supported and screw-adjusting means to adjust said member laterally or vertically upon said standard.

31. A target-practice apparatus, comprising an aiming device, aim-indicating means including an indicating member and a subtarget or other reference object, one of which follows the aim of the aiming device, and means for bringing the subtarget and indicating member with certainty into a predetermined relative position to be there maintained during the adjustment of the apparatus.

32. A target-practice apparatus, having an aiming device and following means to follow and indicate the aim thereof, said device having a positioning movement relatively to said following means about and along one or more axes of revolution, the latter converging with the axis of the aiming device substantially toward a common point.

33. An aiming device, having a comparatively unrestricted aiming movement, a movable indicating member, to follow the aim of said aiming device, means to restrict the range of movement of said indicating member within a definite area, and a connection between said indicating member and aiming device to cause a definite relation to be maintained between the same during normal aiming movement but permitting excess of movement of the aiming device over the indicating member.

34. A target-practice apparatus, having an aiming device, a gyratory follower having a universal support, a ball-and-socket connection between said aiming device and said follower, and means to permit the unseating of said connection.

35. A target-practice apparatus having an aiming device for aiming at a main target, said device being adjustable to accommodate the varying heights of different marksmen in the same aiming posture, following and aim-indicating means all on a single carrier and means for fixing said carrier at different heights to accommodate a marksman in different aiming postures.

36. A target-practice apparatus of the class described having a device for simulating the aiming and firing of a firearm, said device being adjustable to accommodate the varying heights of different marksmen in the same aiming posture, a carrier for said device, and means for fixing said carrier to accommodate different aiming postures of a marksman.

37. In an apparatus of the class described, an aiming device, a carrier therefor, a standard having a plurality of carrier-supporting means at different heights.

38. A target-practice apparatus of the class described, provided with an aiming device, a support therefor, carrier for said apparatus adjustable upon said support, and operating magnets and batteries carried by said carrier.

39. A target-practice apparatus of the class described, having an aiming device for aiming at a target, following means to follow the movements of the device during aiming, means to vary the ratio of movement between such following means and aiming device and indicating devices to indicate the extent of variation.

40. A target-practice apparatus of the class described, having an aiming device for aiming at a target, a gyratory follower, a gyratory indicator, an adjustable connection between the two, means for securing the same in a plurality of positions and an indicator to indicate the position thereof.

41. A target-practice apparatus of the class described, having an aiming device for aiming at a target, following means to indicate the aim thereof, devices for adjusting the device relative to the target and means for indicating the adjustment.

42. A target-practice apparatus of the class described, having an aiming device for aiming at a main target, following means to indicate the aim thereof, a subtarget coöperating with the following means, means for adjusting the aiming device, following means and subtarget relative to the main target and means for indicating the adjustment.

43. A target-practice apparatus of the class described, having an aiming device for aiming at a main target, following means to indicate the aim thereof, a reference object, as a subtarget, coöperating with said following means, and means for bringing the apparatus to a predetermined adjustment, to compensate for a definite degree of defective-eyesight-compensating means for said apparatus.

44. A target-practice apparatus of the class described, having an aiming device for aiming at a main target, following means to indicate the aim thereof, a subtarget coöperating with said following means, means for adjusting said apparatus, so that when the aiming device points to the bull's-eye of the main target the indicating device deviates from the bull's-eye of the subtarget and means for indicating such deviation.

45. A target-practice apparatus of the class described, mounted on a single adjustable carrier and a plurality of vertical and lateral adjusting devices for said carrier whereby said carrier may be given a preliminary adjustment by one set of devices and a subsequent adjustment by another.

46. A target-practice apparatus of the class described, mounted upon an adjustable carrier, a fixed support therefor, a rest for said carrier upon said fixed support, said rest constituting a fulcrum about which said carrier may be adjusted, means for adjusting said carrier laterally or vertically about said rest and means upon the carrier adjustable relatively thereto and engaging said rest to vary the position of said carrier thereon.

47. A target-practice apparatus of the class described, mounted upon a carrier, a fixed support therefor, and a plurality of rests upon said fixed support to engage said carrier.

48. A target-practice apparatus of the class described, mounted upon a removable carrier, a fixed support and a tapered stud thereon to receive said carrier.

49. A target-practice apparatus of the class described, mounted upon a carrier, a fixed support, means carried by the carrier by which the same is secured to said support, said means being adjustable laterally and vertically relatively to said carrier, whereby the position of said carrier and apparatus may be varied.

50. A target-practice apparatus of the class described, having an aiming device for aiming at a main target, and following means to indicate the aim thereof, a subtarget coöperating with said following means, said main target and subtarget being proportioned for practice at a definite range and means for adjusting the apparatus to simulate firing at an increased or diminished range.

51. A target-practice apparatus of the class described, having a freely-movable aiming device for aiming at a target, and a plurality of separately-counterbalanced following devices connected therewith.

52. A target-practice apparatus of the class described having an aiming device for aiming at a target, a jointed holder for said device and separate counterbalancing means for the several jointed members of said holder.

53. A target-practice apparatus of the class described, having an aiming device carried by a support, a plurality of movable members connected with said device, a plurality of weighted arms pivotally mounted on said support and connections between said arms and movable members.

54. A target-practice apparatus of the class described having an aiming device for aiming at a target, a support therefor, a connecting member between said device and said support and a counterweighted arm connected to said member.

55. A target-practice apparatus of the class described having an aiming device, a follower, a jointed holder to permit positioning of the aiming device without necessary deflection of the follower, and a stop to limit the movement of one of the jointed members of said holder.

56. A target-practice apparatus of the class described having an aiming device freely movable about a support, a stop to limit the movement of said device about said support, and a flexible connection between the device and said stop.

57. In an apparatus of the class described an aiming device, a support therefor, a reflecting device and a target or other like object to be aimed at secured to said support and visible to the marksman through said reflecting device.

58. In an apparatus for extended-range practice, an aiming device having an aiming movement in the hands of a marksman, a main target at which the aim of said aiming device is to be directed, aim-recording means to record the aim thereof comprising a recording member and a subtarget, the latter being a counterpart in miniature of said main target, the said aiming device, main target and recording means being all mounted upon a single portable support providing thereby a self-contained target-practice apparatus combined with a mirror to render said main target visible.

59. In an apparatus of the class described an aiming device, a support therefor, a reflecting device, and a plurality of dissimilar targets or other like objects to be aimed at secured to said support to be visible to the marksman through said reflecting device.

60. In an apparatus of the class described an aiming device, a plurality of dissimilar targets at which said device may be aimed and corresponding respectively to dissimilar ranges, following means to follow the movement of said device during aiming, and a subtarget to indicate the aim.

61. In an apparatus of the class described, an aiming device, a plurality of dissimilar targets at which said device may be aimed and corresponding respectively to dissimilar ranges, following means to follow the movement of said device during aiming and means to present to said following means a subtarget corresponding to that one of said dissimilar targets for the time being in use.

62. In an apparatus of the class described, an aiming device, a main target toward which all aiming movement is directed, recording devices to follow and record the aim of the aiming device, including a removable subtarget upon which all record of the aim is effected, and illuminating means for the main target.

63. An apparatus of the class described having a subtarget, a source of light and a main target outlined upon a translucent material interposed between the members and said source of light.

64. In an apparatus of the class described, an aiming device, a translucent main target toward which all aiming movement is directed, recording devices to follow and record the aim of the aiming devices including a subtarget upon which all record of the aim is effected and means to light the main target.

65. An apparatus of the class described having an aiming device adapted to be aimed at a main target and removably connected to a support, an electric circuit normally passing from said support to said device and means for automatically making said circuit on connecting the gun to the support.

66. An apparatus having an aiming device for aiming at a main target, a holder to which said device is removably secured and means for automatically closing electrical connection between the aiming device and holder when the former is positioned upon the latter.

67. An apparatus of the class described having an aiming device, and one or more ball-bearing connected parts having bearing-adjusting means accessible through a central bearing-opening.

68. An apparatus of the class described provided with an aiming device, a holder therefor, and a yielding connection between said device and said holder to normally secure said device to said holder but, by its yielding action, permitting its removal therefrom.

69. An apparatus of the class described provided with an aiming device, a holder therefor, and a yielding connection between said device and said holder to normally secure said device to said holder but permitting its removal therefrom.

70. An apparatus of the class described, provided with an aiming device, a holder therefor, movable with the device during aiming movement, means for securing said device in the holder and manually-operable latching means for said securing means.

71. In an apparatus of the class described, an aiming device, a jointed holder, a ball-bearing between said two holding members, and a spring-pressed bearing, withdrawal of which permits separation of said members.

72. In an apparatus of the class described, an aiming device, a gyratory rod connected therewith and on which said device has a sliding movement and means tending to restore said device to a normal position on said rod when longitudinally displaced thereon.

73. In an apparatus of the class described an aiming device, a gyratory rod for supporting the same and a universal support for said rod, said device being connected to said rod on opposite sides of the universal support.

74. A target-practice apparatus comprising an aiming device having an aiming movement whereby the same may be deflected toward or from a main target or other like object, a follower to follow said aiming movement, an articulated connection between said device and said follower to permit a positioning movement of the former, the axis or axes of articulation converging with the axis of the aiming device and of the said follower substantially toward a common point and means for changing the relation of the axis or axes of articulation.

75. A target-practice apparatus having an aiming device and following means to follow and indicate the aim thereof, said device having a positioning movement relatively to said following means about one or more axes of revolution, the latter converging with the axis of said aiming device substantially toward a common point, and means for changing the angular relation of said axis to change the location of the point of convergence.

In testimony whereof I have signed my name to this specification in the presence of two subscribing witnesses.

HENRY H. CUMMINGS.

Witnesses:
　THOMAS B. BOOTH,
　EVERETT S. EMERY.